US009679556B2

(12) United States Patent
Tyagi et al.

(10) Patent No.: US 9,679,556 B2
(45) Date of Patent: Jun. 13, 2017

(54) METHOD AND SYSTEM FOR SELECTIVELY BIASED LINEAR DISCRIMINANT ANALYSIS IN AUTOMATIC SPEECH RECOGNITION SYSTEMS

(71) Applicant: Interactive Intelligence, Inc., Indianapolis, IN (US)

(72) Inventors: Vivek Tyagi, New Delhi (IN); Aravind Ganapathiraju, Hyderabad (IN); Felix Immanuel Wyss, Zionsville, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 583 days.

(21) Appl. No.: 13/974,123

(22) Filed: Aug. 23, 2013

(65) Prior Publication Data
US 2014/0058731 A1 Feb. 27, 2014

Related U.S. Application Data

(60) Provisional application No. 61/692,934, filed on Aug. 24, 2012.

(51) Int. Cl.
*G10L 15/00* (2013.01)
*G10L 15/06* (2013.01)

(52) U.S. Cl.
CPC .................. *G10L 15/063* (2013.01)

(58) Field of Classification Search
USPC .................. 704/231–257, 270–275
See application file for complete search history.

(56) References Cited

U.S. PATENT DOCUMENTS

| | | | |
|---|---|---|---|
| 5,572,624 A * | 11/1996 | Sejnoha | G10L 15/06 704/251 |
| 6,336,108 B1 * | 1/2002 | Thiesson | G06K 9/6296 704/256 |
| 6,609,093 B1 | 8/2003 | Gopinath et al. | |
| 6,662,160 B1 | 12/2003 | Chien et al. | |
| 6,754,628 B1 | 6/2004 | Chaudhari et al. | |
| 6,964,023 B2 | 11/2005 | Maes et al. | |
| 8,204,737 B2 | 6/2012 | Suominen | |
| 2002/0049568 A1 * | 4/2002 | Erdogan | G06K 9/6234 702/189 |

(Continued)

OTHER PUBLICATIONS

International Preliminary Report on Patentability mailed on Aug. 21, 2014 in related foreign application PCT/US13/56313, (International filing date Aug. 23, 2013).

(Continued)

*Primary Examiner* — Jesse Pullias
(74) *Attorney, Agent, or Firm* — Ice Miller LLP (57) ABSTRACT

A system and method are presented for selectively biased linear discriminant analysis in automatic speech recognition systems. Linear Discriminant Analysis (LDA) may be used to improve the discrimination between the hidden Markov model (HMM) tied-states in the acoustic feature space. The between-class and within-class covariance matrices may be biased based on the observed recognition errors of the tied-states, such as shared HMM states of the context dependent tri-phone acoustic model. The recognition errors may be obtained from a trained maximum-likelihood acoustic model utilizing the tied-states which may then be used as classes in the analysis.

29 Claims, 3 Drawing Sheets

(56) References Cited

U.S. PATENT DOCUMENTS

| | | | |
|---|---|---|---|
| 2002/0049590 A1* | 4/2002 | Yoshino | G10L 15/075 704/241 |
| 2003/0023434 A1* | 1/2003 | Boman | G10L 15/02 704/234 |
| 2006/0136178 A1* | 6/2006 | Kim | G06K 9/627 702/191 |
| 2006/0149558 A1 | 7/2006 | Kahn et al. | |
| 2010/0057462 A1 | 3/2010 | Herbig et al. | |

OTHER PUBLICATIONS

International Search Report issued in related application PCT/US 13/56313 filed Aug. 23, 2013. Mailed Mar. 6, 2014.

Chilean Search Report issued in related application PCT/US 13/56313 filed Aug. 23, 2013, Chile Application No. 0445-2015. Applicant received Mar. 4, 2016.

New Zealand Search Report issued by New Zealand Intellectual Property Office in related application PCT/US13/56313 filed Aug. 23, 2013, NZ Application No. 705075, mailed Oct. 25, 2016.

Hung-Shin Lee, et al: "Linear Discriminant Feature Extraction Using Weighted Classification Confusion Information", in Interspeech, pp. 2254-2257 (2008).

Schaffoner, M., et al: "Improved Robustness of Automatic Speech Recognition using a New Class Definition in Linear Discriminant Analysis", p. 2841 (Sep. 1, 2003).

* cited by examiner

METHOD AND SYSTEM FOR SELECTIVELY BIASED LINEAR DISCRIMINANT ANALYSIS IN AUTOMATIC SPEECH RECOGNITION SYSTEMS

BACKGROUND

The present invention generally relates to telecommunication systems and methods, as well as automatic speech recognition systems. More particularly, the present invention pertains to linear discriminant analysis within automatic speech recognition systems.

SUMMARY

A system and method are presented for selectively biased linear discriminant analysis in automatic speech recognition systems. Linear Discriminant Analysis (LDA) may be used to improve the discrimination between the hidden Markov model (HMM) tied-states in the acoustic feature space. A forced alignment of the speech training data may be performed using Maximum Likelihood Criteria. The data may be further processed to obtain scatter matrices. The matrices may be biased based on the observed recognition errors of the tied-states, such as shared HMM states of the context dependent tri-phone acoustic model. The recognition errors may be obtained from a trained maximum-likelihood acoustic model utilizing the tied-states which may then be used as classes in the LDA analysis.

In one embodiment, a method for training an acoustic model using the maximum likelihood criteria is provided, comprising the steps of: a) performing a forced alignment of speech training data; b) processing the training data and obtaining estimated scatter matrices, wherein said scatter matrices may comprise one or more of a between class scatter matrix and a within-class scatter matrix, from which mean vectors may be estimated; c) biasing the between class scatter matrix and the within-class scatter matrix; d) diagonalizing the between class scatter matrix and the within class scatter matrix and estimating eigen-vectors to produce transformed scatter matrices; e) obtaining new discriminative features using the estimated vectors, wherein said vectors correspond to the highest discrimination in the new space; f) training a new acoustic model based on said new discriminative features; and g) saving said acoustic model.

In another embodiment, a method for training an acoustic model is provided comprising the steps of: a) performing a forced alignment of speech training data; b) performing recognition on said training data and estimating error rates of each tied-state triphone; c) processing the training data and obtaining one or more of an estimated scatter matrix from which a mean vector may be estimated; d) biasing the one or more of an estimated scatter matrix; e) performing diagonalization on one or more of an estimated scatter matrix and estimating a vector to produce one or more transformed scatter matrix; f) obtaining new discriminative features using the transformed one or more of an estimated scatter matrix as a linear transformation of a vector; g) training a new acoustic model; and h) saving said acoustic model.

In another embodiment, a system for training an acoustic model is presented, comprising: a) means for performing a forced alignment of speech training data; b) means for processing the training data and obtaining estimated scatter matrices, which may comprise one or more of a between class scatter matrix and a within-class scatter matrix, from which mean vectors may be estimated; c) means for biasing the between class scatter matrix and the within-class scatter matrix; d) means for diagonalizing the between class scatter matrix and the within class scatter matrix and estimating eigen-vectors to produce transformed scatter matrices; e) means for obtaining new discriminative features using the transformed scatter matrices as a linear transformation of a super vector; f) means for training a new acoustic model; and g) means for saving said acoustic model.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Automatic speech recognition (ASR) systems analyze human speech and translate the speech into text or words. Performance of these systems may be evaluated based on accuracy, reliability, language support, and the speed with which speech can be recognized. Factors such as accent, articulation, speech rate, pronunciation, background noise, etc., can have a negative effect on the accuracy of an ASR system. A system is expected to perform consistently and reliably irrespective of channel conditions and various artifacts introduced by modern telephony channels, especially VoIP. A quick processing speed is necessary to analyze several hundreds of telephone conversations at once and in real-time.

LDA may enhance the accuracy of a system by improving the discrimination between the HMM tied-states in the acoustic feature space. In one embodiment, the between-class and within-class covariance matrices may be biased based on the observed recognition errors of the tied-states. The tied-states may be comprised of shared HMM states of the context dependent triphone acoustic model. The recognition errors are obtained from the previously trained maximum-likelihood acoustic model using the same tied-states which are then used in the LDA analysis as the "classes".

Those skilled in the art will recognize from the present disclosure that the various methodologies disclosed herein may be computer implemented using many different forms of data processing equipment, for example, digital microprocessors and associated memory executing appropriate software program(s).

Figure 1:
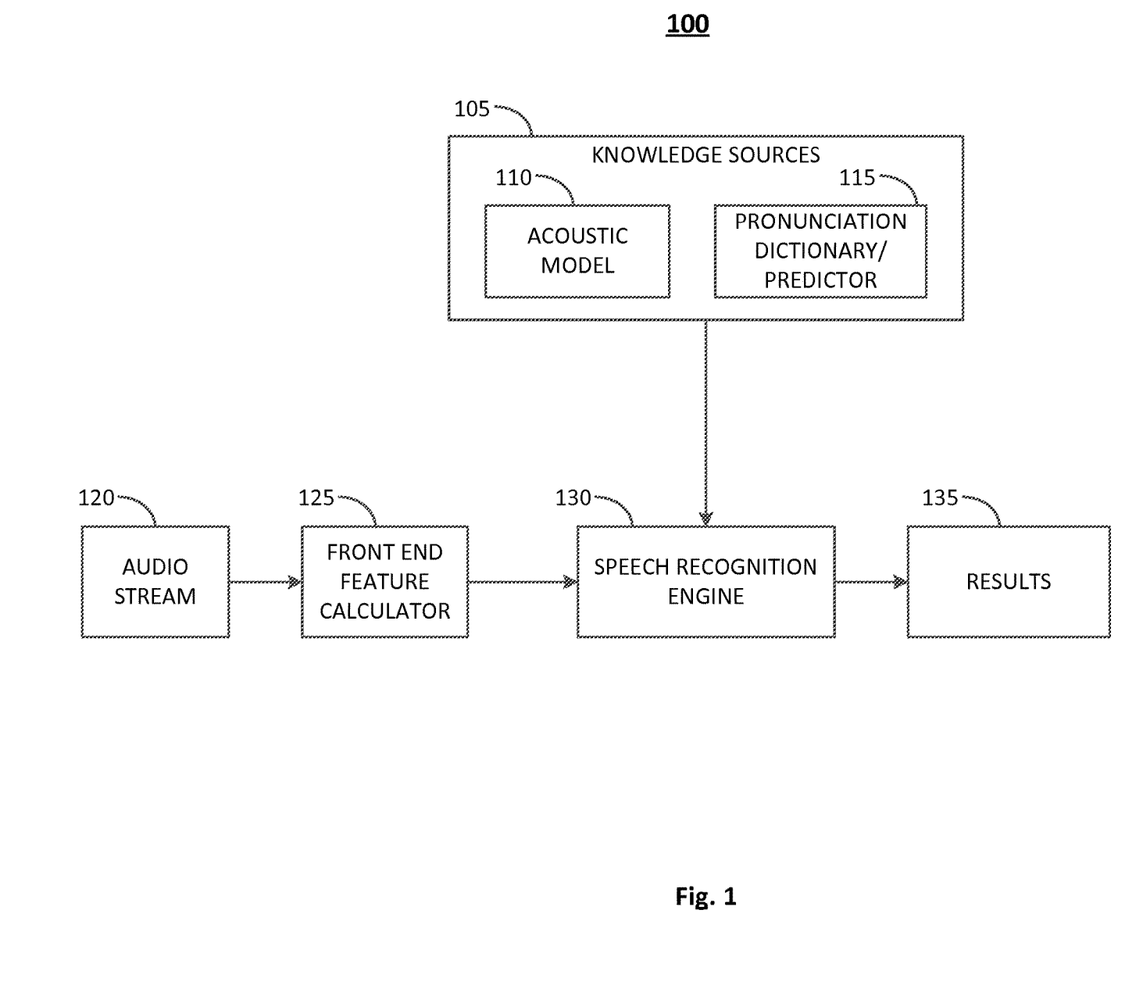
FIG. 1 is a diagram illustrating an embodiment of the basic components in a keyword spotter.

FIG. 1 is a diagram illustrating the basic components of a keyword spotter, indicated generally at 100. The basic components of a keyword spotter 100 may include: Knowledge Sources 105, which may include an Acoustic Model 110 and a Pronunciation Dictionary/Predictor 115; an Audio Stream 120; a Front End Feature Calculator 125; a Speech Recognition Engine 130; and Results 135.

A phoneme is assumed to be the basic unit of sound. A predefined set of such phonemes is assumed to completely describe all sounds of a particular language. The Knowledge Sources 105 may store probabilistic models, for example, hidden Markov model-Gaussian mixture model (HMM-GMM), of relations between pronunciations (phonemes) and acoustic events, such as a sequence of feature vectors extracted from the speech signal. An HMM encodes the relationship of the observed audio signal and the unobserved phonemes. A training process may then study the statistical properties of the feature vectors emitted by an HMM state corresponding to a given phoneme over a large collection of transcribed training-data. An emission probability density for the feature vector in a given HMM state of a phoneme is learned through the training process. This process may also be referred to as acoustic model training. Training may also be performed for a triphone. An example of a triphone may be a tuple of three phonemes in the phonetic transcription sequence corresponding to a center phone. Several HMM states of triphones are tied together to share a common emission probability density function. Typically, the emission probability density function is modeled using a Gaussian mixture model (GMM). A set of these GMMs and HMMs is termed as an acoustic model.

The Knowledge Sources 105 may be developed by analyzing large quantities of audio data. For example, the acoustic model and the pronunciation dictionary/predictor are made by looking at a word such as "hello" and examining the phonemes that comprise the word. Each word in the speech recognition system is represented by a statistical model of its constituent sub-word units called the phonemes. The phonemes for "hello", as defined in a standard phoneme dictionary, are: "hh", "eh", "l", and "ow". These are then converted to a sequence of triphones, for example, "sil–hh+eh", "hh–eh+l", "eh–l+ow", and "l–ow+sil", where "sil" is the silence phone. Finally, as previously described, the HMM states of all possible triphones are mapped to the tied-states. Tied-states are the unique states for which acoustic model training is performed. These models are language dependent. In order to also provide multi-lingual support, multiple knowledge sources may be provided.

The acoustic model 110 may be formed by statistically modeling the various sounds that occur in a particular language. The pronunciation dictionary 115 may be responsible for decomposing a word into a sequence of phonemes. For example, words presented from the user may be in human readable form, such as grapheme/alphabets of a particular language. However, the pattern matching algorithm may rely on a sequence of phonemes which represent the pronunciation of the keyword. Once the sequence of phonemes is obtained, the corresponding statistical model for each of the phonemes (or the corresponding triphones) in the acoustic model may be examined. A concatenation of these statistical models may be used to perform speech recognition. For words that are not present in the dictionary, a predictor, which is based on linguistic rules, may be used to resolve the pronunciations.

The audio stream 120 may be fed into the front end feature calculator, 125, which may convert the audio stream into a representation of the audio stream, or a sequence of spectral features. The audio stream may be comprised of the words spoken into the system by the user. Audio analysis may be performed by computation of spectral features, for example, Mel Frequency Cepstral Coefficients (MFCC) and/or its transforms.

The signal from the front end feature calculator, 125, may then be fed into a speech recognition engine, 130. For example, the task of the recognition engine may be to take a set of words, also referred to as a lexicon, and search through the presented audio stream using the probabilities from the acoustic model to determine the most likely sentence spoken in that audio signal. One example of a speech recognition engine may include, but not be limited to, a Keyword Spotting System. For example, in the multi-dimensional space constructed by the feature calculator, a spoken word may become a sequence of MFCC vectors forming a trajectory in the acoustic space. Keyword spotting may now simply become a problem of computing probability of generating the trajectory given the keyword model. This operation may be achieved by using the well-known principle of dynamic programming, specifically the Viterbi algorithm, which aligns the keyword model to the best segment of the audio signal, and results in a match score. If the match score is significant, the keyword spotting algorithm infers that the keyword was spoken and reports a keyword spotted event.

The resulting sequence of words 135 may then be reported in real-time. For example, the report may be presented as a start and end time of the keyword or a sentence in the audio stream with a confidence value that a word was found. The primary confidence value may be a function of how the keyword is spoken. For example, in the case of multiple pronunciations of a single word, the keyword "tomato" may be spoken as "tuh-mah-tow" and "tuh-may-tow". The primary confidence value may be lower when the word is spoken in a less common pronunciation or when the word is not well enunciated. The specific variant of the pronunciation that is part of a particular recognition is also displayed in the report.

Figure 2:
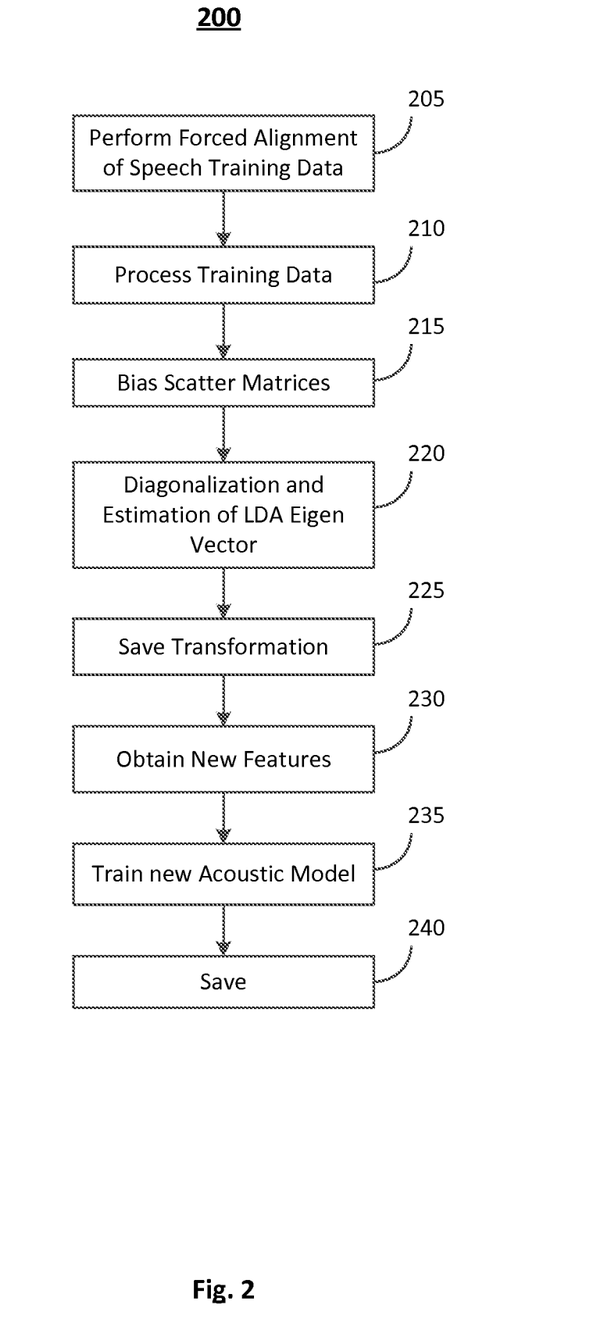
FIG. 2 is a flowchart illustrating an embodiment of a training pattern.

As illustrated in FIG. 2, a process 200 for illustrating an embodiment of a training pattern is provided. The process 200 may be operative in the Acoustic Model 120 of the Knowledge Sources 115 component of the system 100 (FIG. 1). An acoustic model may be trained on a training data set of a desired language using the well-known maximum likelihood (ML) criterion in the process 200.

In operation 205, a forced alignment of the training data may be performed. For example, the forced alignment may be performed by the current Maximum likelihood acoustic model $\mathcal{M}_{ML}$ on the speech training data corpus. In one embodiment, the training data may consist of P phonemes and $P^3$ possible triphones (a 3-tuple of phonemes). Using existing algorithms, for example, a decision tree that is trained based on the phonetic knowledge and the single Gaussian probability density functions of the un-tied triphones, the $P^3$ triphones HMM states may be mapped to K tied-states. Each feature frame may have a tied-state class label. These K tied-states may form unique HMM states which may then be trained using the maximum likelihood (ML) criterion with a Hidden Markov Model-Gaussian Mixture Model (HMM-GMM). These K tied-states may comprise the unique classes between which the discrimination in the acoustic feature space is increased through selectively biased LDA. Control is passed to operation 210 and the process 200 continues.

In operation 210, the training data is processed. For example, the data processing may be performed through a series of mathematical operations. A tied-triphone recognition on the entire training data set may be performed using the acoustic model $\mathcal{M}_{ML}$. The recognition error rate of each of the triphone-tied states may be recorded using the ground-truth, or the transcription of the training data. The error rate of the tied-state i may be defined as $e_i$, where $i \in (1, 2, \ldots, K)$. A 39 dimensional MFCC feature vector $x(t)$ (at time frame t) may be used along with its first and second order derivative to represent a segment of audio corresponding to a triphone. An audio segment may be of any length specified, such as twenty milliseconds, for example. The training data may then be internally mapped to a tied-triphone state (i.e., 1 out of K) in the HMM-GMM system. The 5 adjoining MFCC features (x(t−2), x(t−1), x(t), x(t+1), x(t+2)) are concatenated to form a n=39×5=195 dimensional super vector y(t). A forced Viterbi alignment may be performed in order to assign a tied-state label to each frame x(t) in the training data. The super vector y(t) is assumed to have the same "tied-state" label as each frame, x(t).

The training data may then be further processed in order to estimate the between-class ($S_b$) and with-in class ($S_w$) scatter matrices. For example, using the tied-state labels of the entire training data, the mean of the super vector y(t) may be estimated by averaging over each tied-state class 'k', denoted by $\mu_k$ where k∈(1, 2, . . . , K) in the following equation:

$$\mu_k = \Sigma_{t=1}^{N_k} y^k(t)/N_k$$

Super vector $y^k(t)$ belongs to the tied-state 'k' as per the forced alignment. Overall there are $N_k$ frames belonging to the class 'k' in the entire training data.

Similarly the global mean vector $\mu$ may be estimated in the following mathematical equation:

$$\mu = \Sigma_{t=1}^{T} y(t)/T$$

where 'T' is the total number of frames in the entire training data set. Control is passed to operation 215 and the process 200 continues.

In operation 215, the scatter matricies are biased. The scatter matricies may comprise a between class scatter matrix and a with-in class scatter matrix. In one embodiment, the between-class scatter matrix '$S_b$' is biased. For example, the between-class scatter matrix '$S_b$' may be biased based on the error-rate of the tied-state classes as per the acoustic model $\mathcal{M}_{ML}$. The error rate of each of the tied-states $e_k$ may have been previously recorded through recognition of the training data using the acoustic model $\mathcal{M}_{ML}$. The between-class ($S_b$) scatter matrix may be estimated and biased by taking the error rate of the tied-state classes in account in the following equation:

$$S_b = \Sigma_{k=1}^{K} e_k \times (\mu_k - \mu)(\mu_k - \mu)^t / K$$

where $(\mu_k - \mu)^t$ is the transpose of the column vector $(\mu_k - \mu)$.

In one embodiment, the with-in class ($S_w$) scatter matrix may also be estimated and biased by taking the error rate in account in the following equation:

$$S_w = \Sigma_{t=1}^{T} (y(t) - \mu)(y(t) - \mu)^t / T$$

where $(y(t) - \mu)^t$ is the transpose of the vector $(y(t) - \mu)$, T represents the total number of frames in the training data set, and $\mu$ represents the global mean vector.

Through the multiplication by the error rate '$e_k$', the contribution of the $k^{th}$ tied-state in the between-class scatter matrix may be selectively emphasized. The between-class scatter matrix $S_b$ may become more sensitive to the classes (i.e., the tied-states) that have higher error-rates in the acoustic model $\mathcal{M}_{ML}$. In the new projected discriminative space, it is desired to reduce the error-rates of the classes which are currently performing poorly as per the model $\mathcal{M}_{ML}$. Control is passed to step 220 and process 200 continues.

In operation 220, the diagonalization and estimation of the eigen-vectors is performed. In the following example, a linear transformation U is sought in order to maximize the following criterion $$\underset{U}{\mathrm{argmax}} \frac{U S_b U^T}{U S_w U^T}$$

Simultaneous diagonalization of the matrices $S_w$ and $S_b$ may be performed. In one embodiment, the Principal Component Analysis (PCA) of the matrix $S_w$ may be performed first. The PCA transform matrix of $S_w$ may be represented by 'A' resulting in:

$$A S_w A^t = I$$

where, 'I' represents the identity matrix of size n×n and the superscript 't' represents the transpose of the matrix. The new between-class scatter matrix, $\widetilde{S_b}$, after the transformation by the diagonalizing matrix A, may be found by:

$$\widetilde{S_b} = A S_b A^t$$

and the new within-class scatter matrix $\widetilde{S_w}$ becomes, $$\widetilde{S_w} A S_w A^t = I$$

With this intermediate transform A, the new optimization function becomes: 'Find matrix 'V' that maximizes the following function'

$$\underset{V}{\mathrm{argmax}} \frac{V \widetilde{S_b} V^t}{V \widetilde{S_w} V^t} = \underset{V}{\mathrm{argmax}} \frac{V \widetilde{S_b} V^t}{V I V^t} = \underset{V}{\mathrm{argmax}} V \widetilde{S_b} V^t$$

The solution to the above equation may be obtained by the well-known PCA of the matrix $\widetilde{S_b}$ which is of size n×n. 'd' eigenvectors in the PCA matrix 'V' that correspond to the 'd' highest-eigenvalues of the matrix $\widetilde{S_b}$ is chosen. The truncated matrix of size d×n may be denoted by $V_{trun}$.

The saved final Selectively Biased Linear Discriminant Analysis (SB-LDA) transformation matrix, G, may be represented by:

$$G = V_{trun} \times A.$$

In one embodiment, this matrix is of size d×n. Control is passed operation 225 and the process 200 continues.

In operation 225, the transformation is saved. Control is passed to step 230 and process 200 continues.

In operation 230, new discriminative features z(t) may be obtained. For example, the SB-LDA transform matrix 'G' may be used to obtain the new features as a linear transformation of the super-vector y(t):

$$z(t) = G y(t)$$

where z(t) is the new discriminative feature vector of dimensionality (d×1). Control is passed to step 235 and process 200 continues.

In operation 235, the new acoustic model is trained. For example, parameters may be estimated for the new acoustic model with the resulting new features (i.e., z(t)) that have been obtained through the LDA transform matrix. The LDA transform matrix may be used to train the new acoustic model. With the new feature vectors, the HMM-GMM training is again performed using the maximum likelihood estimation formulae. The result is a new acoustic model $M_{selectiveLDA}$. Control is passed to step 240 and process 200 continues.

In operation 240, the new acoustic models are saved and the process ends. In at least one embodiment, these new acoustic models may be used for speech recognition in the keyword spotter as one of its knowledge sources.

Figure 3:
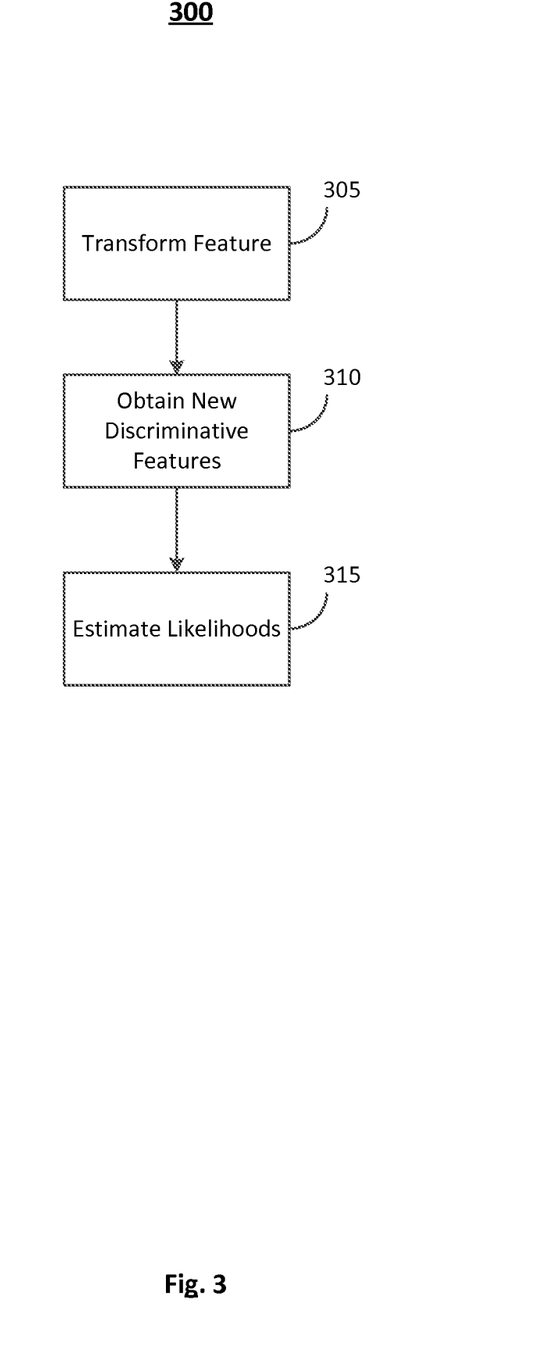
FIG. 3 is a flowchart illustrating an embodiment of recognition.

As illustrated in FIG. 3, a process 300 for illustrating an embodiment of recognition is provided. The process 300 may be operative in the Recognition Engine 140 of the System 100 (FIG. 1).

In step 305, the testing data set's features are transformed. For example, the SB-LDA matrix (i.e.: $G=V_{trun} \times A$) estimated in the process 200 may be used to transform the spliced 5 adjacent MFCC features of the test-data (i.e., y(t)). Control is passed to step 310 and process 300 continues.

In step 310, new discriminative features $z(t)=Gy(t)$ are obtained. For example, the feature space now consists of z(t), which is a transformed feature of the spliced original feature vectors, for example, y(t). Control is passed to step 315 and process 300 continues.

In step 315, the likelihoods of the transformed feature z(t) being emitted by the different triphones are estimated. For example, the likelihoods may be estimated using the acoustic model $M_{selectiveLDA}$. These likelihoods may then be used by the corresponding VITERBI search pattern recognition module of the recognizer within the speech recognition system and the process 300 ends.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for training an acoustic model using the maximum likelihood criteria, comprising the steps of:
    a) performing a forced alignment of speech training data;
    b) processing the training data and obtaining estimated scatter matrices, wherein said scatter matrices may comprise one or more of a between class scatter matrix and a within-class scatter matrix, from which mean vectors may be estimated;
    c) biasing the between class scatter matrix and the within-class scatter matrix;
    d) diagonalizing the between class scatter matrix and the within class scatter matrix and estimating eigen-vectors to produce transformed scatter matrices;
    e) obtaining new discriminative features using the estimated vectors, wherein said vectors correspond to the highest discrimination in the new space;
    f) training a new acoustic model based on said new discriminative features, wherein the training further comprises the steps of:
        estimating parameters with new features obtained through a transformed matrix, and
        using a maximum likelihood formula with new features to perform the training; and
    g) saving said acoustic model.

2. The method of claim 1, wherein step (a) further comprises the step of using the current maximum likelihood acoustic model on the entire speech training data with a Hidden Markov Model-Gaussian Mixture Model.

3. The method of claim 2, wherein said training data may consist of phonemes and triphones wherein:
    a) a triphone's Hidden Markov Model states may be mapped to tied states;
    b) each feature frame may have a tied state class label; and
    c) said tied states may comprise unique classes between which the discrimination in an acoustic feature space is increased through selectively biased linear discriminant analysis.

4. The method of claim 1, wherein step (b) further comprises the steps of:
    a) performing tied triphone recognition on the training data using a trained model;
    b) recording a recognition error rate of each triphone tied state using a transcription of the training data;
    c) representing a segment of audio corresponding to a triphone with a 39 dimensional Mel-frequency cepstral coefficient feature vector and a first order derivative and a second order derivative;
    d) mapping training data internally to a tied-triphone state;
    e) forming a super vector with said Mel-frequency cepstral coefficient features;
    f) performing a forced Viterbi alignment to assign a tied state label to each frame in the training data; and
    g) estimating at least one of the between class and with-in class scatter matrices.

5. The method of claim 4, wherein the error rate of step (b) comprises i∈(1, 2, . . . , K) wherein the fraction of the frames which have a class label 'k' as per the forced alignment but were misrecognized by the recognizer.

6. The method of claim 4, wherein step (g) further comprises the steps of:
    a) estimating a mean of the super vector using the tied state labels of the training data by averaging over each tied state class; and
    b) estimating a global mean vector.

7. The method of claim 6, wherein step (a) is determined using the mathematical equation:

$$\mu_k = \sum_{t=1}^{N_k} y^k(t)/N_k$$

wherein μ represents a global mean vector over a tied-state class k, $y^k(t)$ represents a super vector belonging to a tied-state, and $N_k$ represents a number of frames belonging to a class.

8. The method of claim 6, wherein step (b) is determined using the mathematical equation:

$$\mu = \sum_{t=1}^{T} y(t)/T$$

wherein μ represents a global mean vector, T represents a total number of frames of a training data set, and y(t) represents a super vector.

9. The method of claim 1, wherein step (c) is performed based on an error rate of tied state classes per an acoustic model.

10. The method of claim 9, wherein the error rate for the between class scatter matrix is determined using the mathematical equation:

$$S_b = \sum_{k=1}^{K} e_k \times (\mu_k - \mu)(\mu_k - \mu)^t / K$$

wherein $S_b$ represents a between-class scatter matrix, $e_k$ represents an error rate of each tied-state, $\mu$ represents a global mean vector, $(u_k-\mu)$ represents a column vector, $(u_k-\mu)^t$ represents a transpose of the column vector, and K represents a tied-state.

11. The method of claim 9, wherein the error rate for the within class scatter matrix is determined using the mathematical equation:

$$S_w = \sum_{t=1}^{T} (y(t) - \mu)(y(t) - \mu)^t / T$$

wherein $S_w$ represents a within-class scatter matrix, $\mu$ represents a global mean vector, $(y(t)-\mu)$ represents a vector, $(y(t)-\mu)^t$ represents a transpose of the vector, and T represents a total number of frames in a training data set.

12. The method of claim 1, wherein step (d) further comprises the steps of:
 a) performing a linear transformation;
 b) performing diagonalization;
 c) performing PCA; and
 d) saving the new matrices.

13. The method of claim 12, wherein step (a) is performed using the mathematical equation:

$$\underset{U}{\mathrm{argmax}} \frac{US_b U^T}{US_w U^T}$$

wherein U represents a linear transformation, $S_b$ represents a between-class scatter matrix, $S_w$ represents a within-class scatter matrix, and T represents a total number of frames in a training data set.

14. The method of claim 1 wherein the training in step (b) is performed using a Hidden Markov Model-Gaussian Mixture Model.

15. A method for training an acoustic model, comprising the steps of:
 a) performing a forced alignment of speech training data;
 b) performing recognition on said training data and estimating error rates of each tied-state triphone;
 c) processing the training data and obtaining one or more of an estimated scatter matrix from which a mean vector may be estimated, wherein the processing is performed based on an error rate of tied state classes per an acoustic model;
 d) biasing the one or more of an estimated scatter matrix;
 e) performing diagonalization on one or more of an estimated scatter matrix and estimating a vector to produce one or more transformed scatter matrix;
 f) obtaining new discriminative features using the transformed one or more of an estimated scatter matrix as a linear transformation of a vector;
 g) training a new acoustic model; and
 h) saving said acoustic model.

16. The method of claim 15, wherein step (a) further comprises the step of using the current maximum likelihood acoustic model on the entire training data with a Hidden Markov Model-Gaussian Mixture Model.

17. The method of claim 16, wherein said training data may consist of phonemes and triphones wherein:
 a) a triphone's Hidden Markov Model states may be mapped to tied-states;
 b) each feature frame may have a tied state class label; and
 c) said tied states may comprise unique classes between which the discrimination in an acoustic feature space is increased through selectively biased linear discriminant analysis.

18. The method of claim 15, wherein step (b) further comprises the steps of:
 a) performing tied triphone recognition on the training data using a trained model;
 b) recording a recognition error rate of each triphone tied state using a transcription of the training data;
 c) representing a segment of audio corresponding to a triphone with a 39 dimensional Mel-frequency cepstral coefficient feature vector and a first order derivative and a second order derivative;
 d) mapping training data set internally to a tied-triphone state;
 e) forming a super vector with said Mel-frequency cepstral coefficient features;
 f) performing a forced Viterbi alignment to assign a tied state label to each frame in the training data set; and
 g) estimating the one or more scatter matrices.

19. The method of claim 18, wherein the error rate of step (b) is defined as i∈(1, 2, . . . , K).

20. The method of claim 18, wherein step (g) further comprises the steps of:
 a) estimating a mean of the super vector using the tied state labels of the training data by averaging over each tied state class; and
 b) estimating a global mean vector.

21. The method of claim 20, wherein step (a) is determined using the mathematical equation:

$$\mu_k = \sum_{t=1}^{N_k} y^k(t) / N_k$$

wherein $\mu$ represents a global mean vector over a tied-state class k, $y^k(t)$ represents a super vector belonging to a tied-state, and $N_k$ represents a number of frames belonging to a class.

22. The method of claim 20, wherein step (b) is determined using the mathematical equation:

$$\mu = \sum_{t=1}^{T} y(t) / T$$

wherein $\mu$ represents a global mean vector, T represents a total number of frames of a training data set, and y(t) represents a super vector.

23. The method of claim 15, wherein the one or more of an estimated scatter matrix comprises two scatter matrices, one is a between class scatter matrix and the other is a within class scatter matrix.

24. The method of claim 23, wherein the error rate for the between class scatter matrix is determined using the mathematical equation:

$$S_b = \sum_{k=1}^{K} e_k \times (\mu_k - \mu)(\mu_k - \mu)^t / K$$

wherein $S_b$ represents a between-class scatter matrix, $e_k$ represents an error rate of each tied-state, $\mu$ represents a global mean vector, $(u_k-\mu)$ represents a column vector, $(u_k-\mu)^t$ represents a transpose of the column vector, and K represents a tied-state.

25. The method of claim 23, wherein the error rate for the within class scatter matrix is determined using the mathematical equation:

$$S_w = \sum_{t=1}^{T} (y(t) - \mu)(y(t) - \mu)^t / T$$

wherein $S_w$ represents a within-class scatter matrix, $\mu$ represents a global mean vector, $(y(t)-\mu)$ represents a vector, $(y(t)-\mu)^t$ represents a transpose of the vector, and T represents a total number of frames in a training data set.

26. The method of claim 25, wherein step (a) is performed using the mathematical equation:

$$\operatorname*{argmax}_{U} \frac{U S_b U^T}{U S_w U^T}$$

wherein U represents a linear transformation, $S_b$ represents a between-class scatter matrix, $S_w$ represents a within-class scatter matrix, and T represents a total number of frames in a training data set.

27. The method of claim 15, wherein step (d) further comprises the steps of:
 a) performing a linear transformation;
 b) performing diagonalization, wherein the diagonalization occurs simultaneously with the linear transformation;
 c) performing PCA; and
 d) saving the new matrices.

28. The method of claim 15, wherein step (f) is further comprises the steps of:
 a) estimating parameters with new features obtained through the one or more transformed matrix; and
 b) using a maximum likelihood formula with new features to perform training.

29. The method of claim 28, wherein the training in step (b) is performed using a Hidden Markov Model-Gaussian Mixture Model.

* * * * *